(12) United States Patent
Carpenter et al.

(10) Patent No.: US 9,014,369 B2
(45) Date of Patent: Apr. 21, 2015

(54) VOICE-OVER INTERNET PROTOCOL (VOIP) SCRAMBLING MECHANISM

(75) Inventors: Michael J. Carpenter, Rochester, MN (US); Keith D. Cramer, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 1149 days.

(21) Appl. No.: 12/703,818

(22) Filed: Feb. 11, 2010

(65) Prior Publication Data

US 2011/0194692 A1 Aug. 11, 2011

(51) Int. Cl.
*H04K 1/10* (2006.01)
*H04K 1/00* (2006.01)
*H04L 29/06* (2006.01)

(52) U.S. Cl.
CPC .............. *H04K 1/00* (2013.01); *H04L 63/0428* (2013.01); *H04L 65/1069* (2013.01); *H04L 65/607* (2013.01); *H04L 69/14* (2013.01)

(58) Field of Classification Search
CPC ..... H04L 63/00; H04L 63/04; H04L 63/0428; H04L 63/12; H04L 63/126; H04L 65/00; H04L 65/1066; H04L 65/1069; H04L 65/4092; H04L 65/60; H04L 65/608; H04L 69/00; H04L 69/14; H04L 67/14; H04L 67/143; H04K 1/00; H04M 7/006; H04M 7/0078
USPC ............ 726/26; 713/150–152, 162, 168, 189; 380/210, 212, 216, 247, 255, 257, 268, 380/270, 33, 275, 287; 340/1.1–2.2, 2.8, 340/3.5, 3.52–3.54, 3.7, 4.4, 4.42, 9.1, 340/10.1; 709/230–231, 237, 238, 227–228
See application file for complete search history.

(56) References Cited

U.S. PATENT DOCUMENTS

| 5,771,229 | A  | * | 6/1998 | Gavrilovich | 370/342 |
| 6,222,849 | B1 | * | 4/2001 | Cornes et al. | 370/437 |
| 6,556,563 | B1 | * | 4/2003 | Yarlagadda | 370/352 |
| 6,614,781 | B1 | * | 9/2003 | Elliott et al. | 370/352 |
| 6,724,752 | B1 | * | 4/2004 | Turtiainen et al. | 370/352 |
| 6,778,495 | B1 | * | 8/2004 | Blair | 370/230 |

(Continued)

FOREIGN PATENT DOCUMENTS

EP    2075962 A1 *  7/2009

OTHER PUBLICATIONS

Talipov et al, "Path Hopping Based on Reverse AODV for Security" Proceedings of APNOMS 2006 [Online], APNOMS 2006 [Retrieved on: Oct. 20, 2012], LNCS vol. 4238 pp. 574-577 [Retreived from: http://elmurod.net/sfiles/phr-aodv.pdf ].*

(Continued)

*Primary Examiner* — Saleh Najjar
*Assistant Examiner* — Eric W Shepperd
(74) *Attorney, Agent, or Firm* — Jonathan V. Sry; James R. Nock (57) ABSTRACT

Systems and methods are disclosed for securing VoIP communication. A VoIP device sends a multiple pipe scrambling request, wherein the multiple pipe scrambling request includes (1) a numeric value indicating the number pipes, (2) an IP address for each pipe, and (3) a port number for each pipe. The VoIP device receives confirmation that the scrambling request was received and sends data packets randomly to one or more available pipes on a receiving VoIP device.

15 Claims, 9 Drawing Sheets

(56) References Cited

U.S. PATENT DOCUMENTS

| | | | |
|---|---|---|---|
| 7,099,438 B2 * | 8/2006 | Rancu et al. | 379/9 |
| 7,133,417 B1 * | 11/2006 | Kao et al. | 370/467 |
| 7,542,456 B2 * | 6/2009 | Garg et al. | 370/341 |
| 8,315,275 B2 * | 11/2012 | Nag | 370/468 |
| 2001/0036175 A1 * | 11/2001 | Hurtta | 370/352 |
| 2002/0041588 A1 * | 4/2002 | Gleneck | 370/352 |
| 2002/0176403 A1 * | 11/2002 | Radian | 370/352 |
| 2002/0178455 A1 * | 11/2002 | Poli et al. | 725/109 |
| 2003/0069981 A1 * | 4/2003 | Trovato | 709/228 |
| 2003/0193950 A1 * | 10/2003 | Philips et al. | 370/392 |
| 2003/0210663 A1 * | 11/2003 | Everson et al. | 370/329 |
| 2003/0210711 A1 * | 11/2003 | Faust et al. | 370/474 |
| 2006/0133266 A1 * | 6/2006 | Kim et al. | 370/228 |
| 2006/0187911 A1 * | 8/2006 | Huotari et al. | 370/389 |
| 2006/0268696 A1 * | 11/2006 | Konstantinov et al. | 370/229 |
| 2007/0009064 A1 * | 1/2007 | Cai et al. | 375/308 |
| 2007/0049307 A1 * | 3/2007 | Mueckenheim et al. | 455/509 |
| 2007/0110043 A1 * | 5/2007 | Girard | 370/352 |
| 2007/0280127 A1 * | 12/2007 | Connor et al. | 370/252 |
| 2007/0291759 A1 * | 12/2007 | Brown et al. | 370/392 |
| 2008/0049706 A1 * | 2/2008 | Khandekar et al. | 370/342 |
| 2008/0151885 A1 * | 6/2008 | Horn et al. | 370/389 |
| 2008/0267157 A1 * | 10/2008 | Lee et al. | 370/342 |
| 2008/0285528 A1 * | 11/2008 | Hong | 370/338 |
| 2010/0154049 A1 * | 6/2010 | Yoshimi et al. | 726/13 |
| 2010/0161824 A1 * | 6/2010 | Viger et al. | 709/231 |
| 2010/0177754 A1 * | 7/2010 | Emond et al. | 370/338 |
| 2010/0332665 A1 * | 12/2010 | Jolfaei | 709/228 |
| 2012/0039290 A1 * | 2/2012 | Vrzic et al. | 370/329 |

OTHER PUBLICATIONS

Rosenberg et al., "RFC 3261, SIP: Session Initiation Protocol", The Internet Society, Jun. 2002, pp. 1-269. Copyright © The Internet Society (2002). http://datatracker.ietf.org/doc/rfc3261/.

Rouse, M., "Jitter", TechTarget, Mar. 2008, http://searchunifiedcommunications.techtarget.com/definition/jitter.

Rouse, M., "Packet", TechTarget, Apr. 2007, http://searchnetworking.techtarget.com/definition/packet.

Rouse, M., "VoIP (voice over IP)", Mar. 2008, http://searchunifiedcommunications.techtarget.com/definitionVoIP.

* cited by examiner

VOICE-OVER INTERNET PROTOCOL (VOIP) SCRAMBLING MECHANISM

BACKGROUND

1. Field of the Invention

The field of invention relates to Voice over Internet Protocol ("VoIP") security. In particular, the field of invention relates to securing VoIP communication using a scrambling mechanism.

2. Description of the Related Art

Unlike traditional telephone networks, which are circuit switched and relatively difficult to tap, voice over IP ("VoIP") networks for voice communications are packet switched and vulnerable to interception. Interception techniques enabling non authorized users to intercept and decode voice conversations on VoIP networks are similar to those used to detect other non-VoIP communication on a local area network (LAN) or wide area network (WAN) and are accessible to sophisticated and unsophisticated attackers alike.

Although some VoIP vendors include encryption support into their offerings, many organizations are reluctant to implement the encryption. In part, this is due to the significant computing resources and capacity typically required to support the encryption and decryption algorithms and the associated delays that result in having to encrypt and decrypt voice communication. The need for a VoIP implementation that provides real-time responsiveness has led many organizations to sacrifice security in exchange for performance.

Thus, what is needed is a solution that hides or scrambles the content of voice communication without introducing the additional delay or added complexity typically caused by using encryption.

SUMMARY

In a first embodiment of the invention, a method for securing VoIP communication is provided. The method comprises sending a multiple pipe scrambling request; wherein the multiple pipe scrambling request includes (1) a numeric value indicating the number pipes, (2) an IP address for each pipe, and (3) a port number for each pipe; receiving confirmation that the scrambling request was received; and sending data packets randomly to one or more available pipes on a recipient VoIP device.

In a second embodiment of the invention, a computer readable storage medium containing a program is provided. The program when executed performs an operation for securing VoIP communication, comprising sending a multiple pipe scrambling request; wherein the multiple pipe scrambling request includes (1) a numeric value indicating the number pipes, (2) an IP address for each pipe, and (3) a port number for each pipe; receiving confirmation that the scrambling request was received; and sending data packets randomly to one or more available pipes on a recipient VoIP device.

Other features and aspects of the present invention will become more fully apparent from the following detailed description, the appended claims and the accompanying drawings.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention provides for a more secure VoIP call system that reduces the risk of interception by randomly assigning multimedia data packets across a combination of IP addresses and ports (hereinafter "pipes"). The system reduces the delay typically associated with using encryption and addresses the issue of needing compatible matching encryption algorithms between different vendors and/or different end users. Further the system may be used with existing VoIP technology and may be extended beyond voice to streaming video and messaging.

Figure 1:
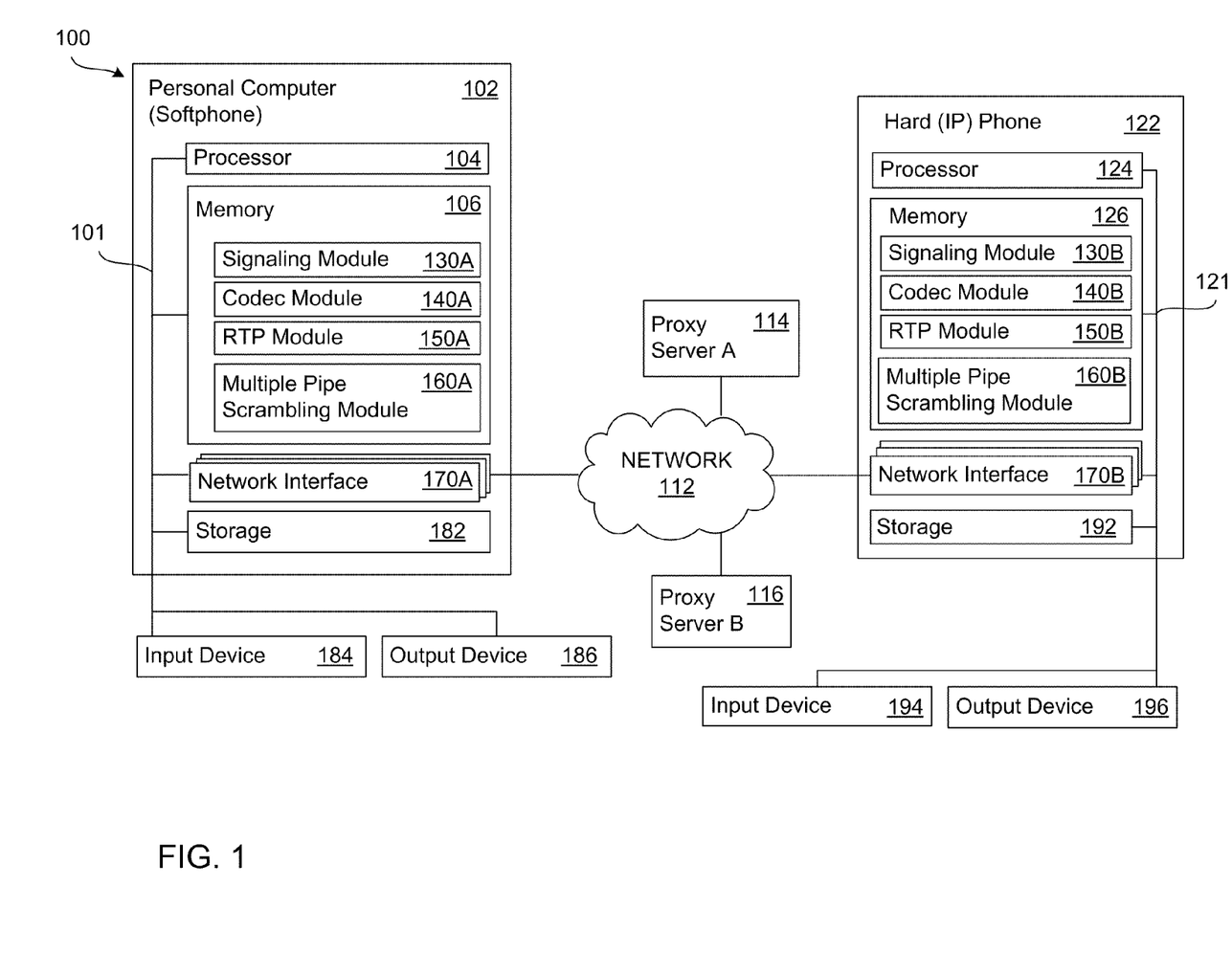
FIG. 1 is a block diagram illustrating a multi-pipe scrambling system for exchanging VoIP communication between a PC and IP phone device, wherein each device is configured to exchange multi-pipe packets, according to one embodiment of the invention.

FIG. 1 is a block diagram, shown generally at 100, illustrating a networked system for exchanging VoIP communication between a PC and IP phone device, wherein each device is configured to exchange multiple pipe (hereinafter "multi-pipe") scrambled packets, according to one embodiment of the invention. The networked system includes a personal computer including software for making telephone calls (hereinafter "PC") 102, and a hard phone configured to receive calls over a computer network (hereinafter "IP phone") 122. The PC 102 and the IP phone 122 are connected via a network 112, wherein the network may be the Internet, for example. In a particular embodiment, initial voice transmission between the PC 102 and the IP phone 122 is handled by a first proxy server, proxy server A 114, and a second proxy server, proxy server B 116. The proxy servers (114 and 116)

may, for example, route call requests to the appropriate user locations, authenticate and authorize users, and implement call routing policies.

The PC 102 generally includes a processor 104 connected via a bus 101 to a memory 106, a network interface 170A, a storage 182, an input device 184, and an output device 186. The PC 102 is generally under the control of an operating system. Examples of operating systems include UNIX, versions of the Microsoft Windows® operating system (note that Microsoft Windows® is a trademark of the Microsoft Corporation, registered in many jurisdictions worldwide), and distributions of the Linux® operating system. (Note: Linux® is a trademark of Linus Torvalds in the United States and other countries.) More generally, any operating system supporting the functions disclosed herein may be used.

The memory 106 may be a random access memory. While the memory 106 is shown as a single entity, it should be understood that the memory 106 may in fact comprise a plurality of modules, and that the memory 106 may exist at multiple levels, from high speed registers and caches to lower speed but larger DRAM chips.

As shown, the memory 106 includes a signaling module 130A, a codec module 140A, a Real-time Transport Protocol (RTP) module 150A, and a multi-pipe scrambling module 160A. The signaling module 130A, when executed on the processor 104, is configured to initiate media communication sessions including voice and video calls, streaming media, and instant messaging for example. The signaling module 130A includes a signaling protocol such as Session Initiation Protocol (SIP), H.323, or Skinny call control protocol (SCCP) for example. In an alternative embodiment, the signaling module 130A may additionally include extensions to the aforementioned signaling protocols. Hereinafter, embodiments of the invention are described in connection with SIP, but those of ordinary skill in the art will appreciate using alternative signaling protocols and related extensions, such as the aforementioned, for use with embodiments of the invention.

The codec module 140A is configured to encode and decode a digital data stream or signal. The RTP module 150A is configured to handle the transfer of multimedia data making use of low latency transport protocols, like stateless User Datagram Protocol (UDP) for example, responsible for encapsulating application data blocks into data units (datagrams, segments) suitable for transfer to the network infrastructure for transmission to the destination host.

Figure 2:
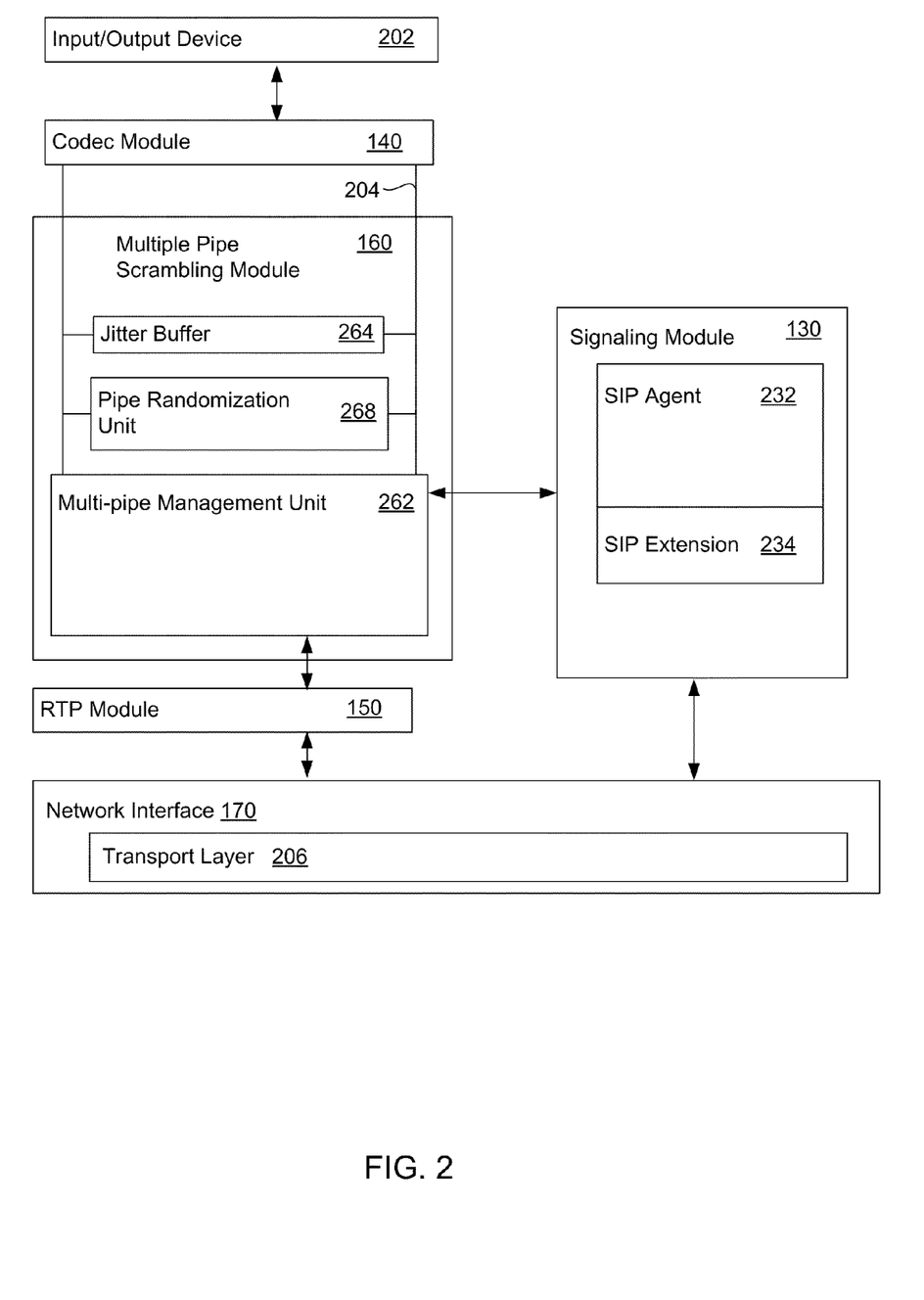
FIG. 2 is a block diagram illustrating in detail the memory modules of FIG. 1 for executing multi-pipe scrambling, according to one embodiment of the invention.

The multi-pipe scrambling module 160A is configured to extend the capabilities of the signaling protocol as explained in further detail in FIG. 2.

In one example, the signaling module 130A, the codec module 140A, the RTP module 150A, and the multi-pipe scrambling module 160A are included as part of a telephony client on the PC 102. In an alternative embodiment, the RTP module 150A may be included as part of the operating system.

The network interface 170A may be any entry/exit device configured to allow network communications between the PC 102 and the IP phone 122 via the network 112. For example, the network interface 170A may be a network adapter or other network interface card (NIC). In addition, the network interface 170A may be configured to establish one or more network connections.

The storage 182 may be a hard disk drive storage device. Although the storage 182 is shown as a single unit, the storage 182 may be a combination of fixed and/or removable storage devices, such as fixed disc drives, floppy disc drives, tape drives, removable memory cards, or optical storage. The memory 106 and the storage 182 may be part of one virtual address space spanning multiple primary and secondary storage devices.

The input device 184 may be any device for providing input to the PC 102 and may include, for example, a headset and microphone. The output device 186 may be any device for providing output to a user of the softphone and may be any conventional display screen or set of speakers, along with their respective interface cards, i.e., video cards and sound cards.

The IP phone 122 generally includes a processor 124 connected via a bus 121 to a memory 126, a network interface 170B, a storage 192, an input device 194, and an output device 196. The processor 124 could be any hardware processor used to perform an embodiment of the invention.

Like the memory 106, the memory 126 may be a random access memory sufficiently large to hold the necessary programming and data structures of the invention. The programming and data structures may be accessed and executed by the processor 124 as needed during operation. While the memory 126 is shown as a single entity, it should be understood that the memory 126 may in fact comprise a plurality of modules, and that the memory 126 may exist at multiple levels, from high speed registers and caches to lower speed but larger DRAM chips.

As shown, the memory 126 includes a signaling module 130B, a codec module 140B, an RTP module 150B, and a multi-pipe scrambling module 160B similar to the memory 106 of the aforementioned PC 102. The signaling module 130B, the codec module 140B, the RTP module 150B, and the multi-pipe scrambling module 160B may be included as part of a telephony client on the IP phone 122 for example. In an alternative embodiment, the RTP module 150B may be included as part of the operating system.

Like the network interface 170A, the network interface 170B may be any entry/exit device configured to allow network communications between the PC 102 and the IP phone 122 via the network 112. For example, the network interface 170B may be a network adapter or other network interface card (NIC).

Like the storage 182, the storage 192 may be a hard disk storage device. Although the storage 192 is shown as a single unit, the storage 192 may be a combination of fixed and/or removable storage devices, such as fixed disc drives, floppy disc drives, tape drives, removable memory cards, or optical storage. The memory 126 and the storage 192 may be part of one virtual address space spanning multiple primary and secondary storage devices.

Like the input device 184, the input device 194 may be any device for providing input to the PC 102 and may include, for example, a headset and microphone. For example, a keyboard, keypad, light pen, touch-screen, track-ball, or speech recognition unit, audio/video player, and the like may be used.

Like the output device 186, the output device 196 may be any device for providing output to a user of the IP phone 122. For example, the output device 196 may be any conventional display screen or set of speakers, along with their respective interface cards, i.e., video cards and sound cards.

Those of ordinary skill in the art will appreciate that the system for exchanging VoIP communication may be modified to include more than two devices and may include, for example, any combination of softphone, IP phone, and standard phone devices, wherein standard phone devices are connected to Foreign eXchange Office (FXO) gateways.

FIG. 2 is a block diagram illustrating in detail the memory modules of FIG. 1 for executing multi-pipe scrambling, according to one embodiment of the invention. In particular, a multiple pipe scrambling module (hereinafter "multi-pipe") 160 is configured to send, receive and reconstruct multi-pipe packets using a mix of components as explained in further detail below.

As shown, the multiple pipe scrambling module 160 (such as multi-pipe scrambling modules 160A and 160B of FIG. 1) is configured to communicate with a codec module 140 (such as codec modules 140A and 140B of FIG. 1) and a signaling module 130 (such as signaling modules 130A and 130B of FIG. 1). The multi-pipe scrambling module 160 is additionally configured to interface with an RTP module 150 (such as RTP modules 150A and 150B of FIG. 1). The operation of the multi-pipe scrambling module 160 is initiated by the signaling module 130 as explained in further detail in the paragraphs to follow.

The signaling module 130 is configured to send and receive multi-pipe scrambling initiation requests. So as to enable the sending and receiving of multi-pipe scrambling initiation requests, in one embodiment, the signaling module 130 includes a SIP agent 232 and a SIP extension 234. The SIP agent 232 includes function for creating, modifying and terminating sessions with one or more participants and is implemented to operate similar to RFC 3261, but designed specifically to include additional function provided by the SIP extension 234, which enables multi-pipe scrambling. Specifically, the SIP agent 232 sends call invitations and receives a response from one or more VoIP devices via the network interface 170, wherein the response is either to accept or reject the call invitation. In addition, the SIP agent 232 receives and responds to call invitations from one or more VoIP devices via the network interface 170. In one embodiment, the SIP agent 232 encrypts the call invitation request messages.

The SIP extension 234 extends the standard SIP parameters to include parameters that enable multi-pipe scrambling between one or more VoIP devices. In one embodiment, the additional parameters in the SIP extension 234 include a multi-pipe scrambling request parameter, a multi-pipe scrambling accept parameter, a multi-pipe scrambling acknowledgement parameter, a parameter including a value representing the number of designated pipes for multi-pipe communication, an IP address for each designated pipe, and a parameter for the port numbers associated with the designated pipes as illustrated in further detail FIGS. 3A-3E.

The signaling module 130, upon executing a request/acknowledge exchange to initiate multi-pipe scrambling communication, initiates the multi-pipe scrambling module 160.

In one embodiment, the multi-pipe scrambling module 160 may include a multi-pipe management unit 262, a jitter buffer 264, and a pipe randomization unit 268 as shown. The multi-pipe management unit 262 is configured to receive from the signaling module 130 the pipes available on the responding VoIP device as provided in the multi-pipe scrambling response. The pipes are made available to the pipe randomization unit 268 which stores the information for subsequent use. In particular, the pipe randomization unit 268 is configured to randomly assign encoded multimedia data packets to the stored pipes.

As shown, the pipe randomization unit 268 receives encoded multi-media data packets 204. The pipe randomization unit 268 is configured to receive output from a codec module 140. The codec module 140 is configured to encode a voice data stream into encoded multimedia data packets 204 and send the output to components in the multi-pipe scrambling module 160. Although not shown, the codec module 140 may include an analog-to-digital converter (ADC) that is configured to convert a continuous signal into the digital voice data stream. In an alternative embodiment, the ADC is separate from the codec module 202. The codec module 140 subsequently encodes the digital voice data stream and outputs the encoded multimedia data packets 204.

The encoded output provided to the multi-pipe scrambling module 160 by the codec module 140 is sent as a formatted unit of data (packet), wherein the packet includes control information (metadata) and user data (payload). Although the codec module 140 may use any one in a plurality of formats (e.g. MPEG, WAV, DivX, etc.) to encode the voice data stream, the codec module 140 is configured to ensure that the format selected from the plurality of formats, includes in the metadata for the packet, sequencing information that is subsequently used by the jitter buffer 264, vis-à-vis the multi-pipe management unit 262 as further detailed below. In other words, the sequence information allows the jitter buffer 264 to reconstruct the packets after transport, which may be subdivided and which may be randomly spread across one or more pipes during the transport process. As shown, the multi-pipe management unit 262 is configured to manage the transport process by interfacing directly with the RTP module 150. In particular, the multi-pipe management unit 262 is configured to send and receive media session communication over a transport layer 206 via the RTP module 150. The multi-pipe management unit 262 is configured to send multimedia packets across a randomly selected, defined set, of IP addresses or ports, or a combination of the two, as defined by the pipe randomization unit 268.

For example, in FIG. 1, the IP phone 122 may indicate in the multi-pipe scrambling acceptance the available pipes for receiving multimedia communication. In response, the PC 102, via the multi-pipe scrambling module 102, may randomly assign multimedia data packets across the available pipes.

In one example, the encoded multimedia data packets are sent over the RTP module 150 in the form of UDP frames. The multi-pipe management unit 262 is configured to establish an RTP session for each unique pipe associated with the VoIP device receiving the multimedia packets, thus creating the potential for multiple RTP sessions and resulting in additional function that is unique from typical VoIP systems using RTP.

Generally, RTP adds a timestamp to the header information of the packets that allow software on a receiving VoIP device to reorder packets more efficiently. The timestamp labels a packet with the time it was transmitted, but a single timestamp can also span several packets that are transmitted close together in time. If some of the packets are received out of order or lost, the timestamp information combined with the sequence numbers in the header facilitate re-sequencing and playback. In the case of the present embodiment herein disclosed, a single conversation that has more than one RTP media sessions established requires a different mechanism for re-sequencing data packets after transport because each RTP media session transports a random combination of encoded multimedia data packets.

The present embodiment addresses this issue by using the sequencing information provided in the encoded multimedia data stream 204. In particular, the multi-pipe management unit 262 is configured to receive an encoded multimedia data packet via one or more RTP sessions and restore segment sequence order. The multi-pipe management unit 262 generally receives the encoded multimedia data packets out of order over one or more RTP media sessions and sends the encoded multimedia data packets to the jitter buffer 264. The jitter buffer 264 uses the sequencing information in the encoded multimedia data stream to restore sequence order. Thus, unlike typical VoIP software systems that make use of the RTP timestamp, the re-sequencing operation executed by the jitter buffer 264 in the current embodiment discards the RTP timestamp provided in favor of the sequencing information provided in the encoded multimedia data stream.

The jitter buffer 264 is further configured to send the properly sequenced encoded multimedia data packet to the codec module 140. The codec module 140, upon receiving the encoded multimedia data stream, is configured to decode the packet, to decode the multimedia data stream, and to stream it to the input/output device 202.

Figure 3A:
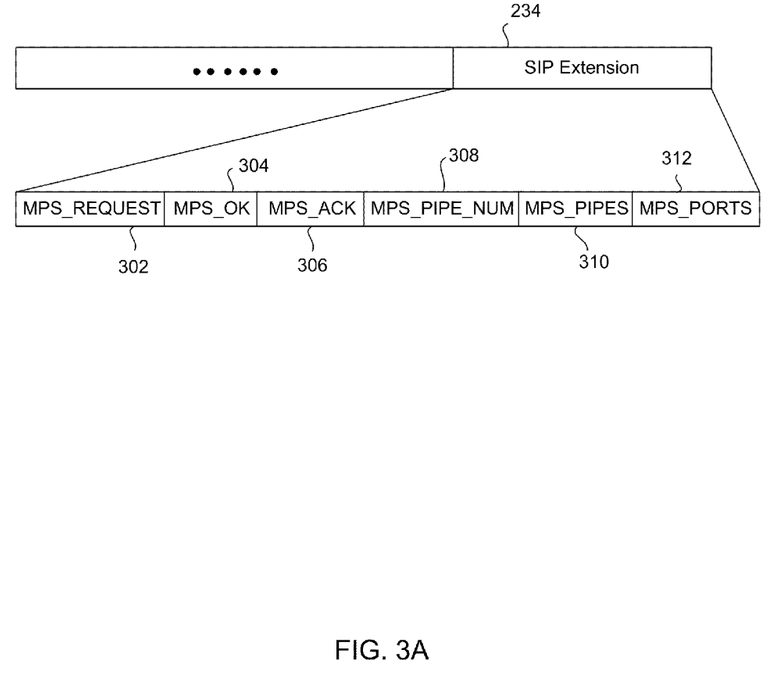
FIG. 3A is a block diagram illustrating a structure of the SIP extension of FIG. 2, according to one embodiment of the invention.

FIG. 3A is a block diagram illustrating one example of a structure of the SIP extension 234 of FIG. 2. In particular, FIG. 3A shows a block view of the SIP extension parameters, wherein the SIP extension parameters include a multi-pipe scrambling request parameter (MPS_REQUEST 302), a multi-pipe scrambling accept parameter (MPS_OK 304), a multi-pipe scrambling acknowledgement parameter (MPS_ACK 306), a parameter for storing a value representing the number of designated pipes for multi-pipe communication (MPS_PIPES_NUM 308), an IP address for each designated pipe (MPS_PIPES 310), and a parameter for the port numbers associated with the designated pipes (MPS_PIPES 312).

The contents of the MPS_REQUEST 302 parameter indicate to a receiving device a request to initiate multi-pipe scrambling. The contents of the MPS_OK 304 parameter indicate to a receiving device an acceptance to a request to initiate multi-pipe scrambling. Additionally, the contents of the MPS_ACK 306 parameter is used to acknowledge receipt of an MPS_OK 306 parameter and confirms initiation of multi-pipe scrambling as detailed further in FIG. 7.

Figure 3B:
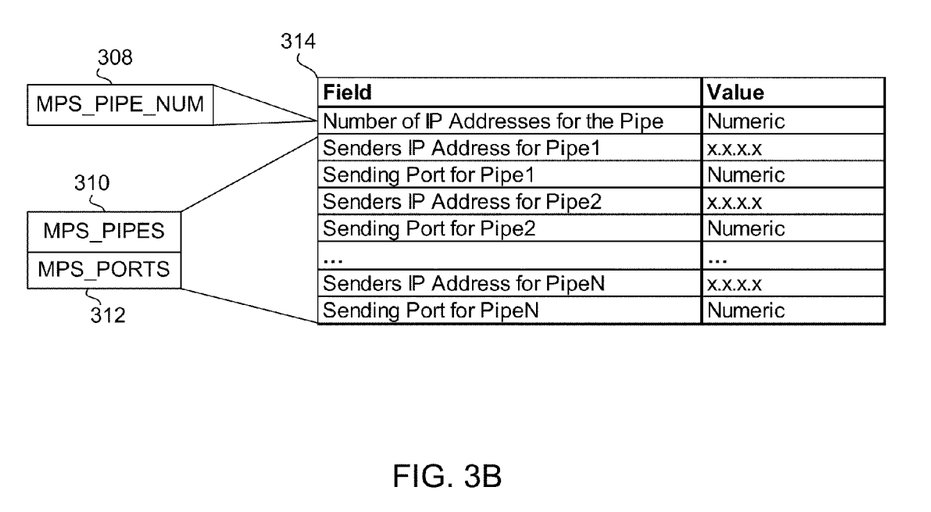
FIGS. 3B-3C are table views illustrating an alternative detailed view of the parameters in a multi-pipe initiation request and accept, according to one embodiment of the invention.
Figure 3C:
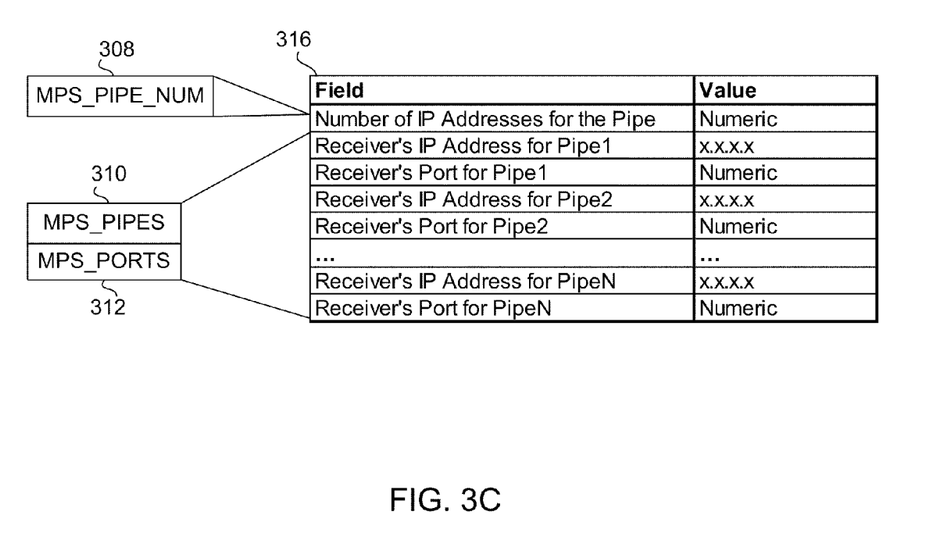
Figure 3D:
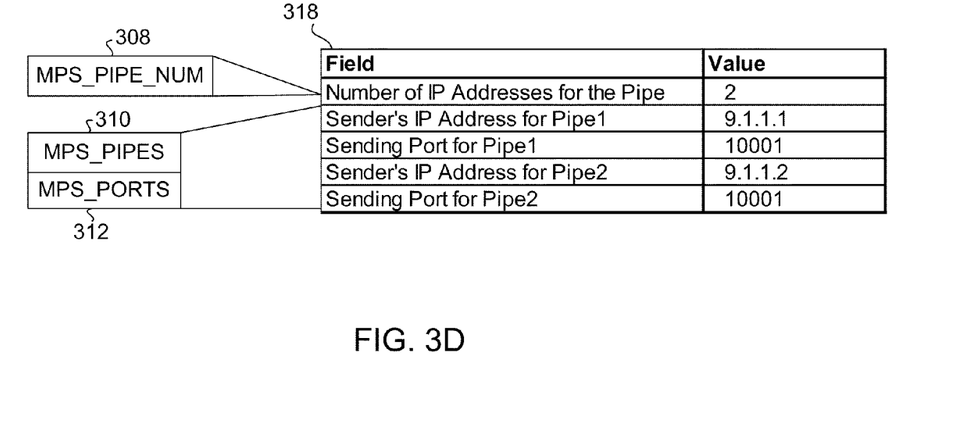
FIGS. 3D-3E is an example illustrating populated parameters in a multi-pipe initiation request and accept, according to one embodiment of the invention.

The contents of the MPS_PIPES_NUM 308 parameter, the MPS_PIPES 310, and the MPS_PORTS 312 parameter indicate to the receiving VoIP device the destination addresses and ports through which multimedia communication may be transmitted as explained in further detail in FIG. 3B-3D.

In an alternative embodiment, the SIP extension may additionally include a "call end" parameter, wherein the value of the call end parameter indicates to the receiving VoIP device the pipe through which BYE messages should be delivered. The initiating VoIP device may be configured to ignore all other BYE messages not received via the pipe designated in the call end parameter. Thus, an additional feature for avoiding interception may include a multi-pipe scrambling mechanism configured to send BYE messages randomly over non-designated pipes so as to by devices that automatically disengage after encountering said BYE message.

A multi-pipe scrambling accept response from a VoIP device includes a list of randomly selected pipes, wherein the randomly selected pipes are chosen from a set of available pipes on the receiving VoIP device as explained in further detail in FIG. 3B-3D.

In one embodiment, the available IP addresses and ports included in the contents of the MPS_PIPES 310 parameter may be provided manually or in an alternative embodiment may be automatically identified.

FIGS. 3B-3C are table views illustrating an alternative detailed view of the parameters in a multi-pipe initiation request and accept, according to one embodiment of the invention.

FIG. 3B shows an example of a segment of a request message 314 in a multi-pipe initiation request, wherein the request message 312 includes a field and a value. The request message 312 may store a numeric value indicating the number of pipes (MPS_PIP_NUM 308) and a requestor IP address (MPS_PIPES 310) and port value for each pipe (MPS_PORTS 312).

FIG. 3C shows an example of a segment of an accept message 316 in a multi-pipe initiation accept, wherein the accept message 316 includes a field and a value. The accept message 316 may, similar to the request message 314, store a numeric value indicating the number of IP addresses (MPS_PIPE_NUM 308) for the pipe and an acceptor IP address (MPS_PIPES 310) and port value for each pipe (MPS_PORTS 312).

Figure 3E:
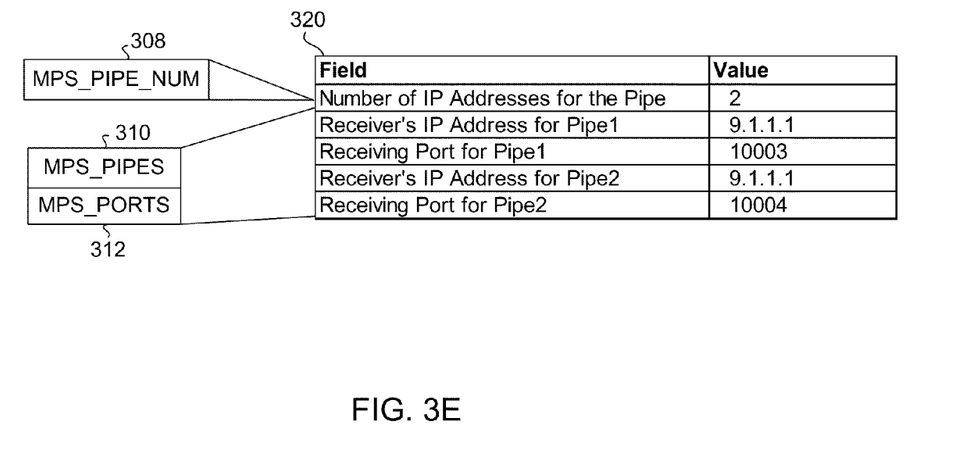

FIGS. 3D-3E are examples illustrating populated parameters in a multi-pipe initiation request and accept.

FIG. 3D shows an example of a segment of a request message 318 for a VoIP device configured to receive multimedia communication through two pipes, wherein each pipe is uniquely identified by an IP address. In particular, the request packet header file details two IP addresses including, IP address 9.1.1.1 for "Pipe1" and IP address 9.1.1.2 for "Pipe2," for receiving multimedia communication. The request packet header file further details a receiving port for each IP address including, 10001 for "Pipe1" and 10001 for "Pipe2."

FIG. 3E is an example of segment of a accept message 320 for a VoIP device configured to receive multimedia communication through two pipes, wherein each pipe is uniquely identified by port number. In particular, the acknowledgement packet header file details two port numbers, including port 10003 for "Pipe1" and port 10004 for "Pipe2," for receiving multimedia communication. The acknowledgement packet header file further details an associated IP address for each port including, IP address 9.1.1.1 for "Pipe1" and IP address 9.1.1.1 for "Pipe2."

Figure 4:
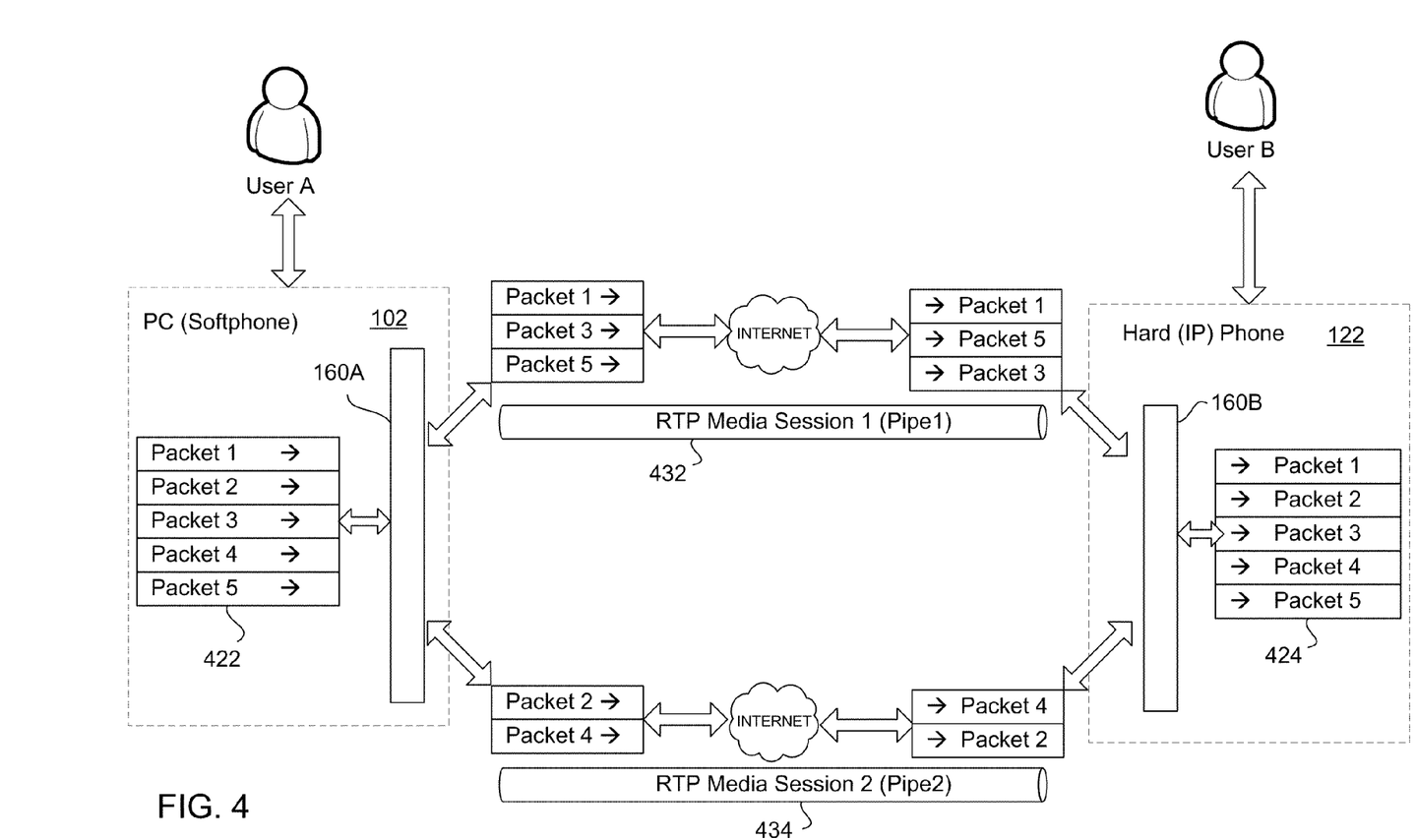
FIG. 4 is a diagram illustrating an example of the end-to-end operation of the multi-pipe scrambling system in FIG. 2, according to one embodiment of the invention.

FIG. 4 is a diagram illustrating an example of the end-to-end operation of the multi-pipe scrambling system in FIG. 1, according to one embodiment of the invention.

As shown, User A sends voice data via a softphone enabled PC, illustrated as PC (softphone) 102, to User B over the Internet via a hard (IP) phone 122. Encoded voice data 422 is randomly assigned by the multi-pipe scrambling module 160A located on the PC 102, to RTP media session 1 (Pipe1) 432 and RTP media session 2 (Pipe2) 434. The packets arrive to the IP phone out of order and are restored to proper sequence order, as shown by 424, by the multi-pipe scrambling module 160B located on the IP phone 122 accounting for lost packets. In an alternative example, the packets arrive in order, thus eliminating the need to restore proper sequence.

In an alternative embodiment, the softphone 102 and IP phone 122 may additionally continually adjust, from coarse to fine, the sampling rate of the encoders on each based on errors introduced from packet loss over the network and impacted by the multi-pipe scrambling. As packet loss increases the softphone 102 and IP phone 122 may negotiate to increase the sampling rate (fine) of voice data to improve quality of output.

Figure 5:
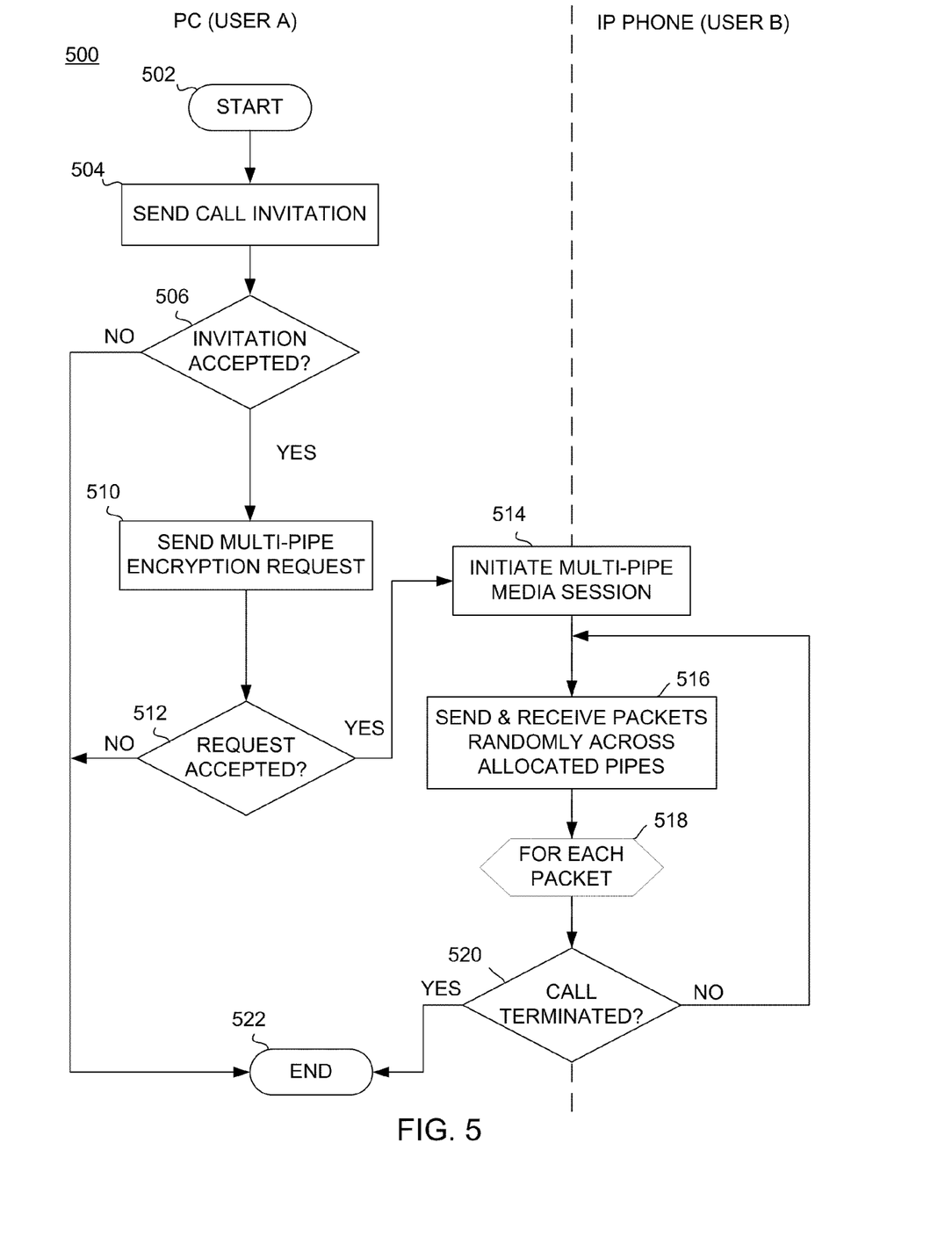
FIG. 5 is a flowchart illustrating the operation of the multi-pipe scrambling system, according to one embodiment of the invention.

FIG. 5 is a flowchart illustrating the operation of the multi-pipe scrambling system 500, according to one embodiment of the invention.

As shown, the process begins at block 502. At block 504, the system sends a call invitation. At block 506, the system determines if the invitation was accepted. If NO, control passes to block 522, the end of process 500. If YES, control passes to block 510. At block 510, the system sends a multi-pipe scrambling request and control passes to block 512. At block 512, the system determines if the request was accepted. If NO, control passes to block 522, the end of process 500. If YES, control passes to block 514. At block 514, the system initiates the multi-pipe media session, wherein one or more RTP media sessions are established. At block 516, the system sends and receives packets across randomly allocated pipes. At block 518, the system determines for each packet, if the call was terminated 520. If YES, control passes to block 522, the end of process 500. If NO, control passes to block 516 and the process repeats.

In an alternative embodiment, the call invitation request and the multi-pipe encryption request are included in the same message so as to reduce the number of messages sent between VoIP devices.

Figure 6:
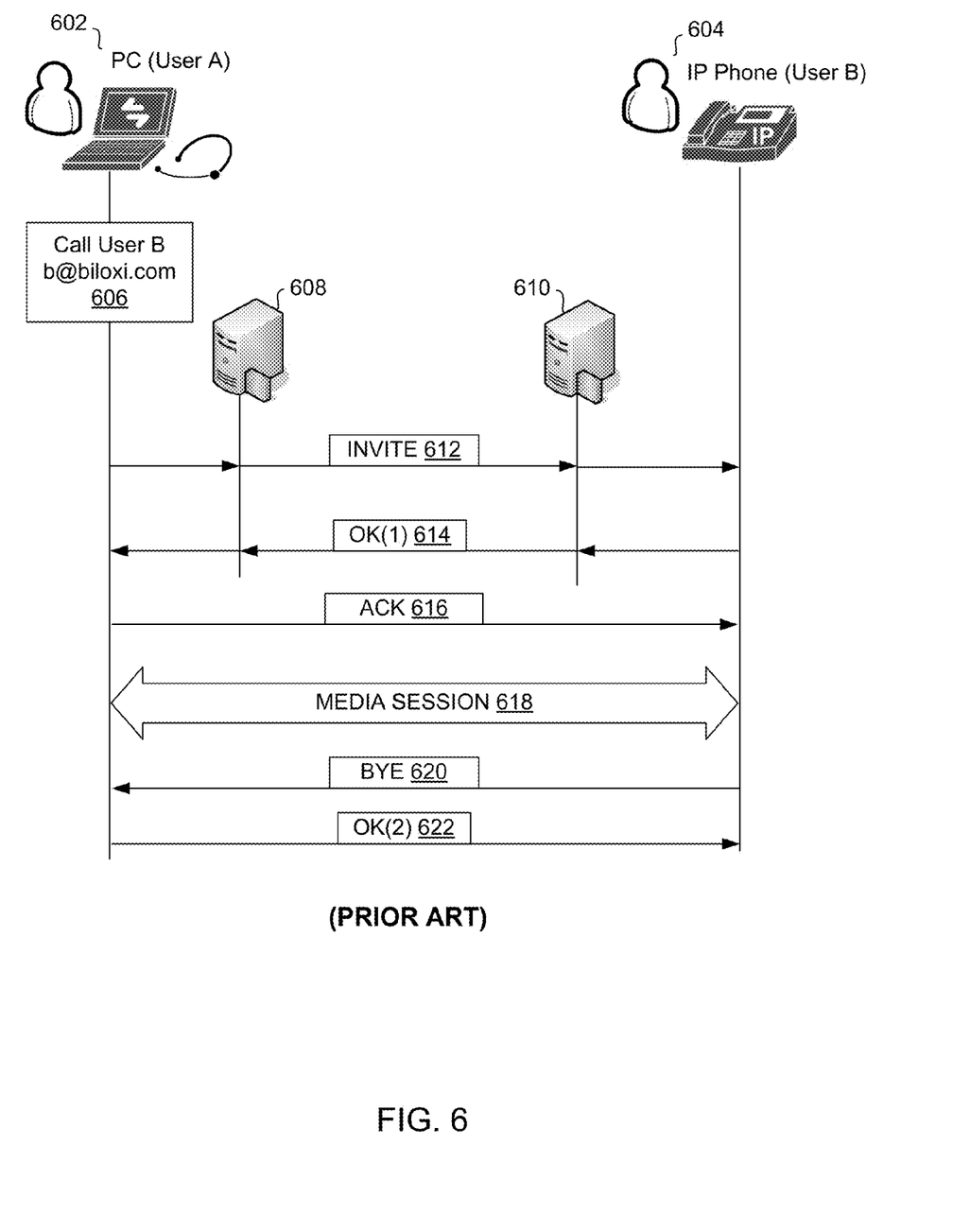
FIG. 6 is a diagram illustrating the operation of the SIP protocol as is known in the art.

FIG. 6 is a diagram illustrating the operation of the SIP protocol as is known in the art. As shown, User A initiates a call that sends, via a PC 602, a call invitation to User B at b@biloxi.com 606. An INVITE 612 is directed through a first proxy server 608 and a second proxy server 610 that facilitates session establishment with User A and User B respectively. User B responds, via an IP phone 604, with an OK response 614 that is returned via the second proxy server 610 and the first proxy server 608 to User A's unique locator. Upon receiving the OK 614 response, the PC 602 is configured to respond with an acknowledgement (ACK) 616, wherein the response is direct to User B's unique identifier bypassing the proxy servers. After completing the INVITE/OK/ACK handshake a media session 618 is established, enabling the exchange of media packets. At the end of the call User B hangs up and generates a BYE 620 message. The PC confirms receipt of the BYE 620 message with an OK message 622, thus terminating the media session 618 and the BYE transaction.

Figure 7:
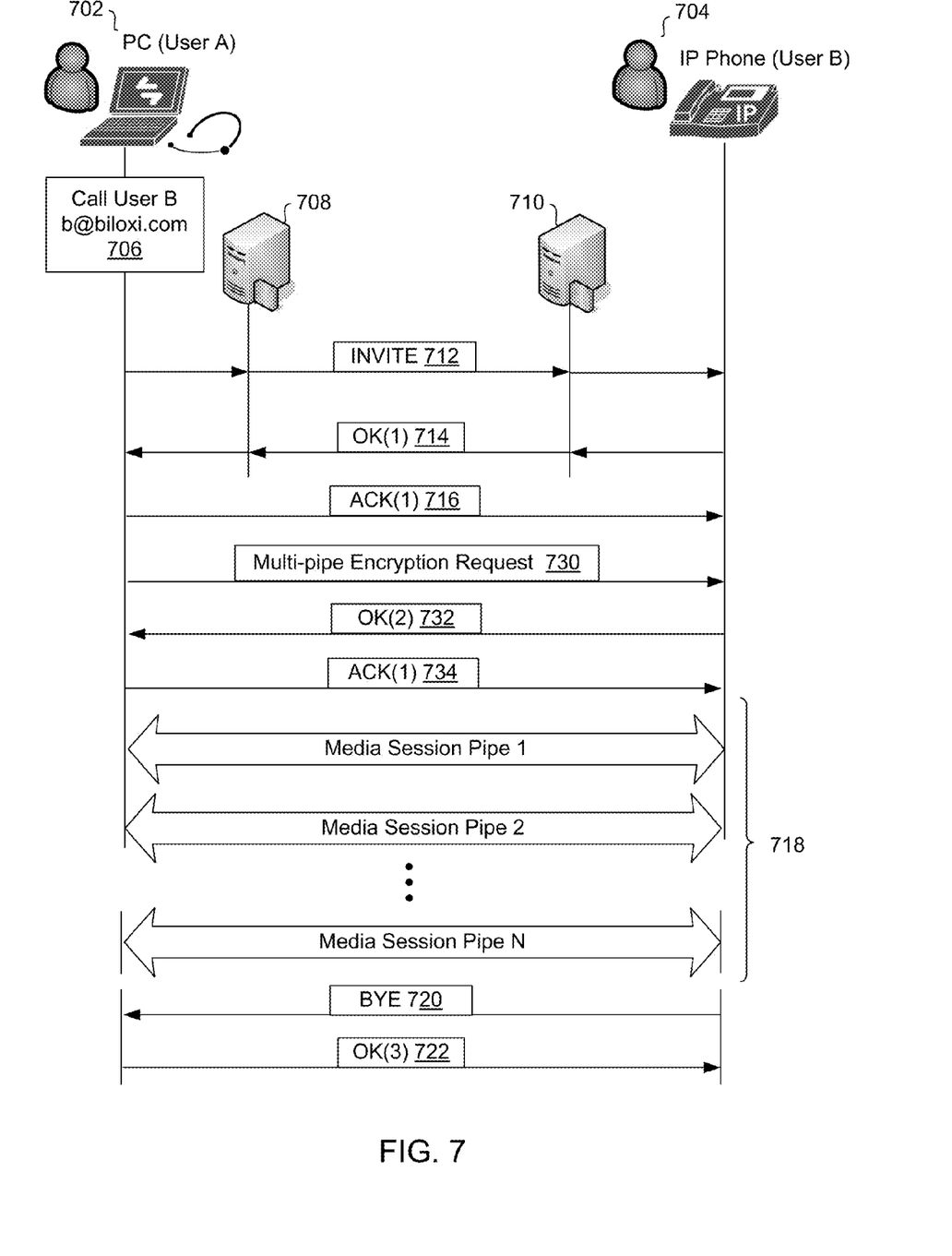
FIG. 7 is a diagram illustrating an example of the operation of the multi-pipe scrambling system in combination with the SIP protocol, according to one embodiment of the invention.

FIG. 7 is a diagram illustrating an example of the operation of the multi-pipe scrambling system in combination with the SIP protocol, according to one embodiment of the invention. Similar to FIG. 6, User A sends, via a PC 702, a call invitation to User B at b@biloxi.com 706. An INVITE 712 is directed through a first proxy server 708 and a second proxy server 710 that facilitates session establishment with User A and User B respectively. User B responds, via an IP phone 704, with an OK response 714 that is returned via the second proxy server 710 and the first proxy server 708 to User A's unique locator. Upon receiving the OK 714 response, the PC 702 is configured to respond with an acknowledgement (ACK) 716, wherein the response is direct to User B's unique identifier bypassing the proxy servers.

Unlike FIG. 6, after completing the INVITE/OK/ACK handshake the PC is configured to send a multi-pipe scrambling request 730. The multi-pipe scrambling request 730 includes a request packet header file specifying the number of IP addresses for the pipe and a requestor IP address and port value for each pipe, as detailed in FIGS. 3A and 3C and associated descriptions. Upon receiving the multi-pipe request the IP phone is configured to respond with an acknowledgement 732 that includes an acknowledgement packet header file specifying a numeric value indicating the number of IP addresses for the pipe and an acknowledger IP address and port value for each pipe, as detailed in FIGS. 3B and 3D and associated descriptions. After completing the request/acknowledgement handshake 732, 734, one or more media sessions are established, including media session pipes 1-N 718, enabling the exchange of media packets.

At the end of the call User B hangs up and generates a BYE 720 message. User A confirms receipt of the BYE 720 message with an OK message 722, thus terminating the media session 718 and the BYE transaction.

As noted in FIG. 5, in an alternative embodiment, the call invitation request and the multi-pipe encryption request are included in the same message so as to reduce the number of messages sent between VoIP devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for securing voice over Internet Protocol (VoIP) communication, comprising configuring one or more processors to perform an operation, comprising:
    sending a multiple pipe scrambling request from a VoIP device;
        wherein the multiple pipe scrambling request includes (1) a numeric value indicating a plurality of pipes between at least two VoIP devices, (2) an Internet Protocol (IP) address for each pipe, and (3) a port number for each pipe;
    receiving a confirmation that the multiple pipe scrambling request was accepted;
        wherein one or more available pipes on a recipient VoIP device is provided in the confirmation; and
    initiating a multiple pipe media session after receiving the confirmation that the multiple pipe scrambling request was accepted, wherein the multiple pipe media session uses a Real-time Transport Protocol (RTP) media session for at least one pipe between the at least two VoIP devices;
        wherein data packets corresponding to voice data are sent randomly to the one or more available pipes on the recipient VoIP device during the multiple pipe media session and the data packets are received out of order by the recipient VoIP device.

2. The computer implemented method of claim 1, further comprising receiving data packets randomly over one or more available pipes as provided in the multiple pipe scrambling request.

3. The computer implemented method of claim 1, wherein the received confirmation includes a (1) numeric value indicating the number of pipes, (2) an IP address for each pipe, and (3) a port number for each pipe.

4. The computer implemented method of claim 1, wherein the multiple pipe scrambling request further includes a call end value, wherein the call end value randomly designates a pipe for sending messages to end a call, wherein the pipe transmits the data packets and the end call value.

5. The computer implemented method of claim 4, further comprising receiving randomly one or more call end messages via pipes different from the designated pipe in the call end value and disregarding the one or more call end messages.

6. A computer readable storage medium, wherein the computer readable storage medium is not a transitory signal, containing a program which, when executed, causes a computer to perform an operation for securing voice over Internet Protocol (VoIP) communication, comprising:
    sending a multiple pipe scrambling request from a VoIP device;
        wherein the multiple pipe scrambling request includes (1) a numeric value indicating a plurality of pipes between at least two VoIP devices, (2) an Internet Protocol (IP) address for each pipe, and (3) a port number for each pipe;
    receiving confirmation that the multiple pipe scrambling request was accepted;
    wherein one or more available pipes on a recipient VoIP device is provided in the confirmation; and
    initiating a multiple pipe media session after receiving the confirmation that the multiple pipe scrambling request was accepted, wherein the multiple pipe media session uses a Real-time Transport Protocol (RTP) media session for at least one pipe between the at least two VoIP devices;
        wherein data packets corresponding to voice data are sent randomly to the one or more available pipes on the recipient VoIP device during the multiple pipe media session and the data packets are received out of order by the recipient VoIP device.

7. The computer readable storage medium of claim 6, further comprising receiving data packets randomly over one or more available pipes as provided in the multiple pipe scrambling request.

8. The computer readable storage medium of claim 6, wherein the received confirmation includes a (1) numeric value indicating the number of pipes, (2) an IP address for each pipe, and (3) a port number for each pipe.

9. The computer readable storage medium of claim 6, wherein the multiple pipe scrambling request further includes a call end value, wherein the call end value randomly designates a pipe for sending messages to end a call, wherein the pipe transmits the data packets and the end call value.

10. The computer readable storage medium of claim 9, further comprising receiving randomly one or more call end messages via pipes different from the designated pipe in the call end value and disregarding the one or more call end messages received.

11. A system, comprising:
   a processor; and
   a memory containing a program, which when executed by the processor is configured to perform an operation for securing voice over Internet Protocol (VoIP) communication comprising:
      sending a multiple pipe scrambling request from a VoIP device;
         wherein the multiple pipe scrambling request includes (1) a numeric value indicating a plurality of pipes between at least two VoIP devices, (2) an Internet Protocol (IP) address for each pipe, and (3) a port number for each pipe;
      receiving confirmation that the multiple pipe scrambling request was accepted;
         wherein one or more available pipes on a recipient VoIP device is provided in the confirmation; and
      initiating a multiple pipe media session after receiving the confirmation that the multiple pipe scrambling request was accepted wherein the multiple pipe media session uses a Real-time Transport Protocol (RTP) media session for at least one pipe between the at least two VoIP devices;
         wherein data packets corresponding to voice data are sent randomly to the one or more available pipes on the recipient VoIP device during the multiple pipe media session and the data packets are received out of order by the recipient VoIP device.

12. The system of claim 11, further comprising receiving data packets randomly over one or more available pipes as provided in the multiple pipe scrambling request.

13. The system of claim 11, wherein the received confirmation includes a (1) numeric value indicating the number of pipes, (2) an IP address for each pipe, and (3) a port number for each pipe.

14. The system of claim 11, wherein the multiple pipe scrambling request further includes a call end value, wherein the call end value randomly designates a pipe for sending messages to end a call, wherein the pipe transmits the data packets and the end call value.

15. The system of claim 14, further comprising receiving randomly one or more call end messages via pipes different from the designated pipe in the call end value and disregarding the one or more call end messages received.

* * * * *